(12) United States Patent
Zhang

(10) Patent No.: US 10,671,449 B2
(45) Date of Patent: Jun. 2, 2020

(54) METHODS AND APPARATUSES FOR SETTING APPLICATION PROPERTY AND MESSAGE PROCESSING

(71) Applicants: BEIJING LENOVO SOFTWARE LTD., Beijing (CN); LENOVO (BEIJING) LIMITED, Beijing (CN)

(72) Inventor: Dongyuan Zhang, Beijing (CN)

(73) Assignees: LENOVO (BEIJING) LIMITED, Beijing (CN); BEIJING LENOVO SOFTWARE LTD., Beijing (CN)

( * ) Notice: Subject to any disclaimer, the term of this patent is extended or adjusted under 35 U.S.C. 154(b) by 710 days.

(21) Appl. No.: 14/860,833

(22) Filed: Sep. 22, 2015

(65) Prior Publication Data

US 2017/0003863 A1 Jan. 5, 2017

(30) Foreign Application Priority Data

Jun. 30, 2015 (CN) .......................... 2015 1 0374497
Jun. 30, 2015 (CN) .......................... 2015 1 0378115

(51) Int. Cl.
*G06F 9/54* (2006.01)
*G06F 3/0481* (2013.01)

(52) U.S. Cl.
CPC ............ *G06F 9/542* (2013.01); *G06F 3/0481* (2013.01)

(58) Field of Classification Search
None
See application file for complete search history.

(56) References Cited

U.S. PATENT DOCUMENTS

| 2006/0074844 A1* | 4/2006 | Frankel ................. G06Q 10/06 |
| 2006/0136808 A1* | 6/2006 | Chirilov ............... G06F 17/246 715/217 |
| 2006/0212806 A1* | 9/2006 | Griffin ................. G06F 17/218 715/206 |
| 2008/0154953 A1* | 6/2008 | Kinouchi ............. G11B 27/105 |
| 2010/0328725 A1* | 12/2010 | Gaucas ................ G06F 3/1204 358/1.18 |
| 2013/0311920 A1* | 11/2013 | Koo ..................... G06F 3/04883 715/765 |
| 2014/0225925 A1* | 8/2014 | Hayashi .................. G06F 16/51 345/634 |

(Continued)

FOREIGN PATENT DOCUMENTS

| CN | 101414997 A | 4/2009 |
| CN | 101655892 A | 2/2010 |

(Continued)

*Primary Examiner* — Toan H Vu
(74) *Attorney, Agent, or Firm* — Scully Scott Murphy & Presser

(57) ABSTRACT

The present disclosure provides methods and apparatuses for setting application property and message processing. Based on a setting instruction, an object for the setting instruction is determined. The object is a preset group including at least one application. Properties of all the applications in the group are set uniformly in accordance with the setting instruction. With the above setting process, after a message has been received, a group to which the application as the recipient of the message belongs is determined, a property common to the applications in the group is obtained and the message is processed based on the public property.

6 Claims, 5 Drawing Sheets

```
┌─────────────────────────────────────────────────────────┐  S101
│ Determine, based on a setting instruction, an object for│
│ the setting instruction, the object being a preset group│
│      including at least one application                 │
└─────────────────────────────────────────────────────────┘
                              │
                              ▼
┌─────────────────────────────────────────────────────────┐  S102
│   Set properties of all the applications in the group  │
│  uniformly in accordance with the setting instruction  │
└─────────────────────────────────────────────────────────┘
```

(56) References Cited

U.S. PATENT DOCUMENTS

| | | | | |
|---|---|---|---|---|
| 2015/0146986 A1* | 5/2015 | Sugiura | ............. | G06K 9/00402 |
| | | | | 382/189 |
| 2015/0227360 A1* | 8/2015 | Kim | ......................... | G06F 8/65 |
| | | | | 717/169 |
| 2015/0254348 A1* | 9/2015 | Alasaarela | ................ | G06F 8/34 |
| | | | | 717/104 |
| 2018/0329976 A1* | 11/2018 | Gessner | ................. | G06F 16/28 |

FOREIGN PATENT DOCUMENTS

| | | |
|---|---|---|
| CN | 103248613 A | 8/2013 |
| CN | 103546641 A | 1/2014 |
| CN | 104363247 A | 2/2015 |
| CN | 104375748 A | 2/2015 |
| CN | 104506729 A | 4/2015 |
| EP | 2 175 343 A1 | 4/2010 |

* cited by examiner

METHODS AND APPARATUSES FOR SETTING APPLICATION PROPERTY AND MESSAGE PROCESSING

TECHNICAL FIELD

The present disclosure relates to electronic information field, and more particularly, to methods and apparatuses for setting application property and message processing.

BACKGROUND

With the development of smart electronic devices, there has been an explosive growth in various applications.

Currently, most applications have a function of automatically pushing messages. For a user, some of the pushed messages are useful, while some message pushed from some applications are simply interferences. In order to satisfy the user's requirements, the user needs to configure the applications individually to enable the message pushing function of some applications and disable the message pushing function of the other applications. As the number of the applications increases, such configuration process becomes too troublesome.

In addition, most electronic devices have many applications installed thereon. When a user is using an electronic device, an application may synchronize data via a network in background even if it has been deactivated. For example, application clients such as weather or news in a mobile phone may send or receive relevant data anytime for synchronization, such that a large amount of data traffic will be consumed without the user's awareness. In this case, the electronic device may be demanding on network traffic. In order to prevent an application from consuming traffic in background, the user typically needs to disable the synchronization setting for the application manually. Alternatively, the user may manage applications by installing application management software (e.g., safeguard) to configure an application to be disconnected from the network based on a timer or prompt a traffic limit. However, these configuration or management schemes require troublesome operations.

SUMMARY

In an aspect of the present disclosure, a method for setting application property is provided. The method comprises: determining, based on a setting instruction, an object for the setting instruction, the object being a preset group including at least one application; and setting properties of all the applications in the group uniformly in accordance with the setting instruction.

In another aspect of the present disclosure, a method for setting application property is provided. The method comprises: adding a first application to a preset group; obtaining a public property of the group that is common to all applications in the group; and setting a property of the first application to the public property of the group.

In another aspect of the present disclosure, a processing method is provided. The method is applied in an electronic device and comprises: obtaining a message for an application on the electronic device; determining whether the application satisfies a predetermined condition; and processing the obtained message when the application satisfies the predetermined condition.

In yet another aspect of the present disclosure, an electronic device is provided. The electronic device comprises: a casing; a processing provided within the casing and configured to: obtain a message for an application on the electronic device; determine whether the application satisfies a predetermined condition; and process the obtained message when the application satisfies the predetermined condition.

BRIEF DESCRIPTION OF THE DRAWINGS

In order to illustrate the solutions according to the embodiments of the present disclosure or the prior art clearly, the figures used for description of the embodiments or the prior art will be introduced briefly here. It is apparent to those skilled in the art that the figures described below only illustrate some embodiments of the present disclosure and other figures can be obtained from these figures without applying any inventive skills.

DETAILED DESCRIPTION OF THE EMBODIMENTS

Figure 1:
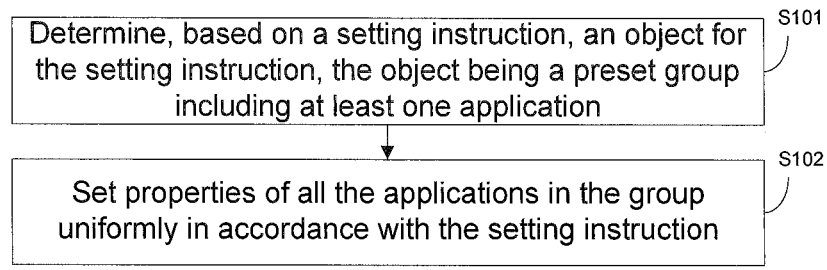
FIG. 1 is a flowchart illustrating a method for setting application property according to an embodiment of the present disclosure.

The embodiments of the present disclosure provide methods and apparatuses for setting application property and methods and apparatuses for message processing. All these can be applied in an electronic device having applications installed thereon.

In the following, the embodiments of the present disclosure will be described in further detail with reference to the figures, such that the objects, solutions and advantages of the present disclosure will become more apparent. Obviously, the embodiments described below are only some, rather than all, of the embodiments. Starting from the embodiments of the present disclosure, those skilled in the art can obtain other embodiments with applying any inventive skills. All these embodiments are to be encompassed by the scope of the present disclosure.

In an embodiment of the present disclosure, the electronic device can be a Personal Computer (PC), a notebook computer, a tablet computer (or PAD) or a mobile phone. The present disclosure is not limited to any specific electronic device.

Further, in an embodiment of the present disclosure, a network port can be a network protocol port to a connection oriented service or a connectionless service in a network, e.g., port 80 for web browsing service or port 21 for FTP service. It can be an interface of the electronic device for communicating with the outside world. In practice, the network port can provide the applications installed on the electronic device with logical interfaces for network connection.

Optionally, in an embodiment of the present disclosure, there can be a number of applications on the electronic device. These applications can be installed on the electronic device at manufacture, or can be installed by the user. Typically, application icons associated with the respective applications will be displayed on a display unit of the electronic device. For example, the application icons can be arranged on the display unit in a particular order. When the user wants to use an application function of an application, he/she can activate the application by clicking its associated application icon.

Further, the term "and/or" as used herein only represents a relationship between correlated objects, including three possibilities. For example, "A and/or B" means A, B, or both. In addition, unless indicated otherwise, the symbol "/" as used herein represents an "or" relationship between the correlated objects preceding and succeeding the symbol.

The present disclosure provides methods and apparatuses for setting application property and message processing. Based on a setting instruction, an object for the setting instruction is determined. The object is a preset group including at least one application. Properties of all the applications in the group are set uniformly in accordance with the setting instruction. Since the properties of all the applications in the group can be set uniformly on a per group basis, the user only needs to set a certain property once for a large number of applications, such that the application setting process can be simplified. Alternatively, after an application has been added to a group, a property of the application can be set to a public property of the group that is common to all applications in the group.

With the above setting process, after a message has been received, a group to which the application as the recipient of the message belongs is determined, a property common to the applications in the group is obtained and the message is processed based on the property. Therefore, the user only needs to set the group and the applications in the group can process messages in accordance with the user's setting. That is, no matter which of the applications in the group receives a message, the processing of the message by that application will satisfy the user's requirements.

In an embodiment of the present disclosure, a method for setting application property is provided. As shown in FIG. 1, the method includes the following steps.

At step S101, based on a setting instruction, an object for the setting instruction is determined. The object is a preset group including at least one application.

In this embodiment, the preset group can be a preset display page for displaying at least one application. The display page is displayable in separate screens with a plurality of display pages. The pages displayed in separate screens constitute a desktop menu.

Figure 2:
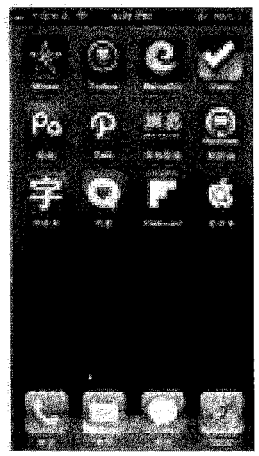
FIG. 2 is a schematic diagram showing a currently displayed page of a desktop menu.

For example, as shown in FIG. 2, a page including a number of application icons is currently displayed on a display screen of the electronic device. This page is a desktop menu or a part thereof. If the desktop menu includes further display pages, this page and the other display pages can be switched in response to the user's sliding gesture. In this embodiment, the "present group" refers to any of the display pages of the desktop menu.

Alternatively, the preset group can be a preset folder. That is, each folder is a group and includes at least one application.

No matter which of the above grouping schemes is adopted, in this embodiment, the group can be set by determining applications having identical properties as a group based on preset categories of properties. The categories of properties are preset by a user or based on functions of the applications.

For example, the preset categories of properties may include categories of game, audiovisual and social networking. The game applications can be placed in a single display page on the desktop or in a single folder, so as to constitute a group. Of course, applications can be added to or removed from the group.

At step S102, properties of all the applications in the group are set uniformly in accordance with the setting instruction.

It is to be noted here that some of the applications in the group may not have the property indicated in the setting instruction and no processing is required for such applications.

That is, with the method according to this embodiment, all the applications in the preset group can be responders of the setting instructions. Hence, the user can set the properties of these applications with one instruction, such that the setting process can be simplified for the user's convenience.

Figure 3:
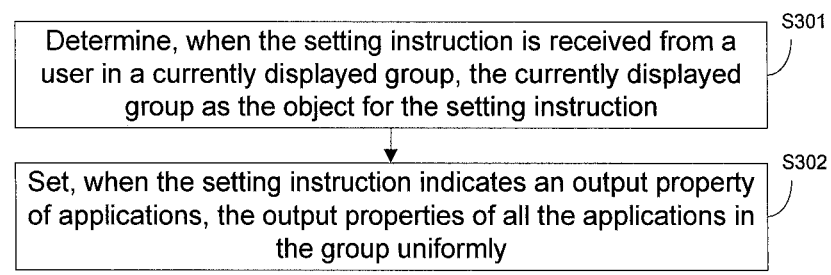
FIG. 3 is a flowchart illustrating another method for setting application property according to an embodiment of the present disclosure.

In an embodiment of the present disclosure, another method for setting application property is provided. As shown in FIG. 3, the method includes the following steps.

At step S301, when a setting instruction is received from a user in a currently displayed group, the currently displayed group is determined as the object for the setting instruction.

Referring to the grouping schemes described in connection with the above embodiment, in this embodiment, the currently displayed group can be a currently displayed page in a desktop menu (as shown in FIG. 2) or a currently opened folder in the preset folder.

For example, when the user long presses and selects a font setting option in the page shown in FIG. 2, the page is the responder of the setting instruction and the application icons in this page will be adjusted in accordance with the font setting by the user.

At step S302, when the setting instruction indicates an output property of applications, the output properties of all the applications in the group are set uniformly.

In particular, when the setting instruction indicates the output property of applications to be "do not disturb", the output properties of all the applications in the group can be set as "do not disturb". When the setting instruction indicates the output property of applications to be "prompt pushed messages", the output properties of all the applications in the group can be set as "prompt pushed messages".

Currently, as the number of applications increases rapidly, messages pushed by the applications have become a big disturbance for the user. Conventionally, in order to avoid the disturbance caused by the pushed messages, the use can only set the output properties of the applications as "do not disturb" individually. With the method according to this embodiment, all the applications in the group can be the receivers of the instruction. Hence, the user only needs to perform the setting once (e.g., the user may long press the display page shown in FIG. 2, select an "output mode setting" option in a pop-up window and set the output mode as "do not disturb"), such that the setting process can be simplified for the user's convenience.

Figure 4:
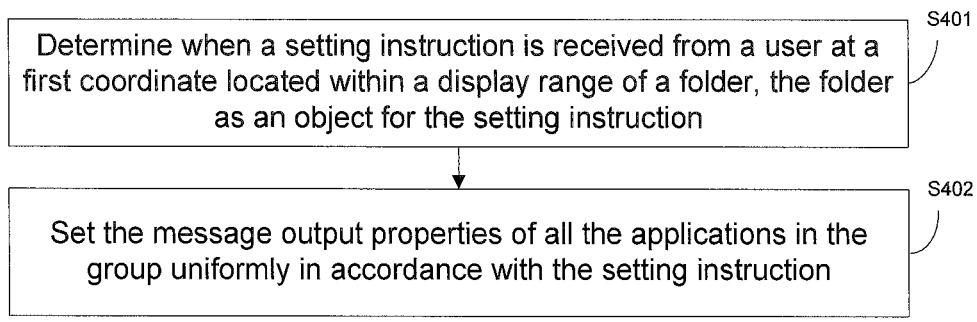
FIG. 4 is a flowchart illustrating another method for setting application property according to an embodiment of the present disclosure.

In an embodiment of the present disclosure, another method for setting application property is provided. As shown in FIG. 4, the method includes the following steps.

At step S401, when a setting instruction is received from a user at a first coordinate located within a display range of a folder, the folder is determined as an object for the setting instruction. The setting instruction indicates a message output property of applications.

That is, the user can input the setting instruction on an icon of a particular folder. For example, the user may long press the icon of the folder and select an "output mode setting" option in a pop-up window to set the output mode.

At step S402, the message output properties of all the applications in the group are set uniformly in accordance with the setting instruction.

With the method according to this embodiment, the application setting process can be simplified.

Figure 5:
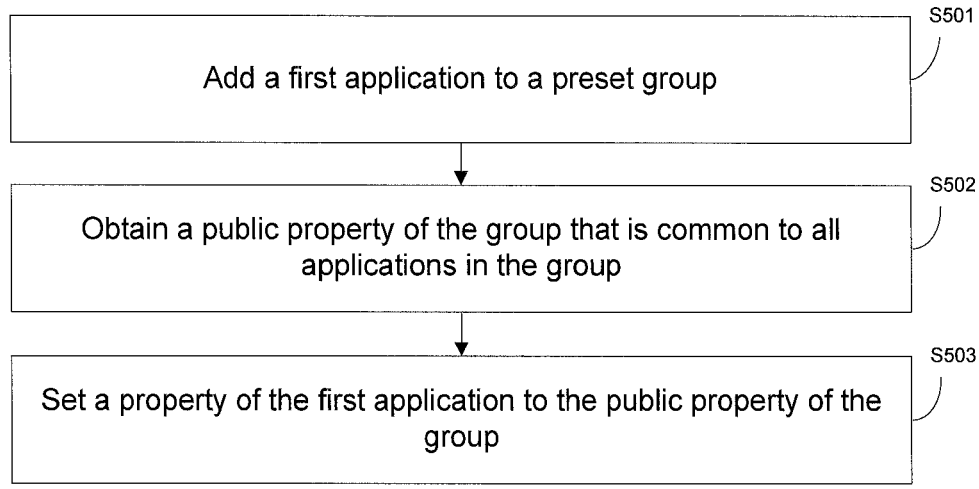
FIG. 5 is a flowchart illustrating another method for setting application property according to an embodiment of the present disclosure.

In an embodiment of the present disclosure, another method for setting application property is provided. As shown in FIG. 5, the method includes the following steps.

At step S501, a first application is added to a preset group.

In particular, in this embodiment, the preset group can be a preset display page which is displayable in separate screens with a plurality of display pages. The pages displayed in separate screens constitute a desktop menu.

Alternatively, the preset group can be a preset folder.

Here, the preset group may or may not have included one or more other applications.

At step S502, a public property of the group that is common to all applications in the group is obtained.

In this embodiment, the public property of the group can be set in advance. In particular, a group can be created and a public property can be set before any application is added to the group (i.e., when no application is included in the group). Then, when an application has been added to the group, a property of the application can be set in accordance with the public property. Alternatively, when a group has been created and applications have been added to the group, the properties of all the applications in the group can be set uniformly, as described in connection with the above embodiments, so as to obtain the public property.

At step S503, a property of the first application is set to the public property of the group.

With the method according to this embodiment, for example, when the icon of the first application is dragged into a display page of the desktop menu that has a public property of "output mode of 'do not disturb'", the output mode of the first application can be set to "do not disturb".

Hence, with the method according to this embodiment, once an application is added to a group, a property of the application can be set automatically such that the application can satisfy a public property of the group. In this way, the user's requirements can be met.

Figure 6:
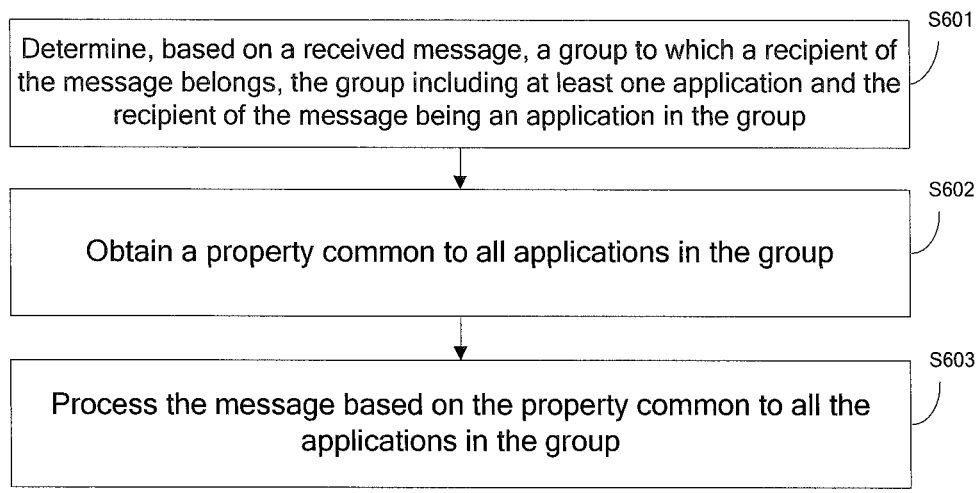
FIG. 6 is a flowchart illustrating a method for message processing according to an embodiment of the present disclosure.

In an embodiment of the present disclosure, a method for message processing is provided. As shown in FIG. 6, the method includes the following steps after properties of applications in a group have been set according to the method for setting application property in the above embodiments.

At step S601, based on a received message, a group to which a recipient of the message belongs is determined. The group includes at least one application and the recipient of the message is an application in the group.

At step S602, a property common to all applications in the group is obtained. The property is uniformly set to all the applications in the group in advance based on a setting instruction.

At step S603, the message is processed based on the property common to all the applications in the group.

For example, an electronic device receives a message and determines that the recipient of the message is a video player application. In this case, a message output property common to all applications in the group to which the video player application belongs can be obtained. If the message output property is "do not disturb", the video player application will not prompt the message.

For the categories of groups and their setting rules in this embodiment, reference can be made to the above embodiments.

With the method according to this embodiment, once a message is received by an application in a group, it is processed in accordance with a property common to all the applications in the group. Accordingly, all the applications can process messages in a uniform way for the user's convenience.

Figure 7:
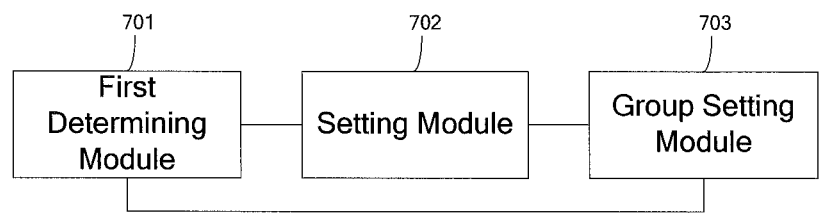
FIG. 7 is a block diagram showing a structure of an apparatus for setting application property according to an embodiment of the present disclosure.

Correspondingly to the above method embodiments, in an embodiment of the present disclosure, an apparatus for setting application property is provided. As shown in FIG. 7, the apparatus includes the following modules.

A first determining module 701 determines, based on a setting instruction, an object for the setting instruction. The object is a preset group including at least one application.

A setting module 702 sets properties of all the applications in the group uniformly in accordance with the setting instruction.

In particular, the first determining module can determine the object for the setting instruction based on the setting instruction by determining the object for the setting instruction based on the setting instruction. The object is a preset group. The preset group includes a preset display page for displaying at least one application. The display page is displayable in separate screens with a plurality of display pages. The pages displayed in separate screens constitute a desktop menu. Alternatively, the preset group includes a preset folder including at least one application.

Alternatively, the first determining module can determine the object for the setting instruction based on the setting instruction by determining, when the setting instruction is received from a user in a currently displayed group, the currently displayed group as the object for the setting instruction. The currently displayed group is a currently displayed page in the desktop menu or a currently opened folder in the preset folder.

Alternatively, the first determining module can determine the object for the setting instruction based on the setting instruction by determining, when the setting instruction is received from a user at a first coordinate located within a display range of a folder, the folder as the object for the setting instruction.

In particular, the setting module can set the properties of all the applications in the group uniformly in accordance with the setting instruction by setting message output properties of all the applications in the group uniformly in accordance with the setting instruction. The setting instruction indicates message output properties of applications.

Optionally, the apparatus of this embodiment can further include a group setting module 603 for determining applications having identical properties as a group based on preset categories of properties. The categories of properties can be preset by a user or based on functions of the applications.

With the apparatus according to this embodiment, the application setting process can be simplified for the user's convenience.

Figure 8:
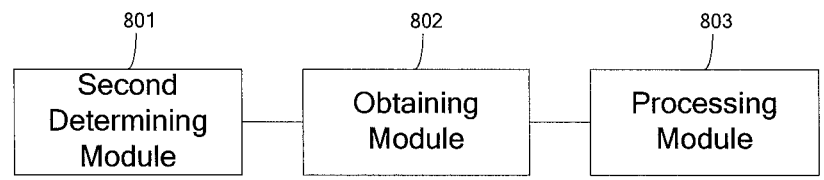
FIG. 8 is a block diagram showing a structure of an apparatus for message processing according to an embodiment of the present disclosure.

In an embodiment of the present disclosure, an apparatus for message processing is provided. As shown in FIG. 8, the apparatus includes the following modules.

A second determining module 801 determines, based on a received message, a group to which a recipient of the message belongs. The group includes at least one application and the recipient of the message is an application in the group.

An obtaining module 802 obtains a property common to all applications in the group. The property is uniformly set to all the applications in the group in advance based on a setting instruction.

A processing module 803 processes the message based on the property common to all the applications in the group.

In particular, the second determining module can determine the group to which the recipient of the message belongs by determining the group to which the recipient of the message belongs based on the received message. The preset group includes a preset display page for displaying at least one application. The display page is displayable in separate screens with a plurality of display pages. Alternatively, the preset group includes a preset folder including at least one application.

The processing module can process the message based on the property common to all the applications in the group by processing the message based on message output properties of all the applications in the group.

With the apparatus according to this embodiment, all the applications can process messages in a uniform way for the user's convenience.

Figure 9:
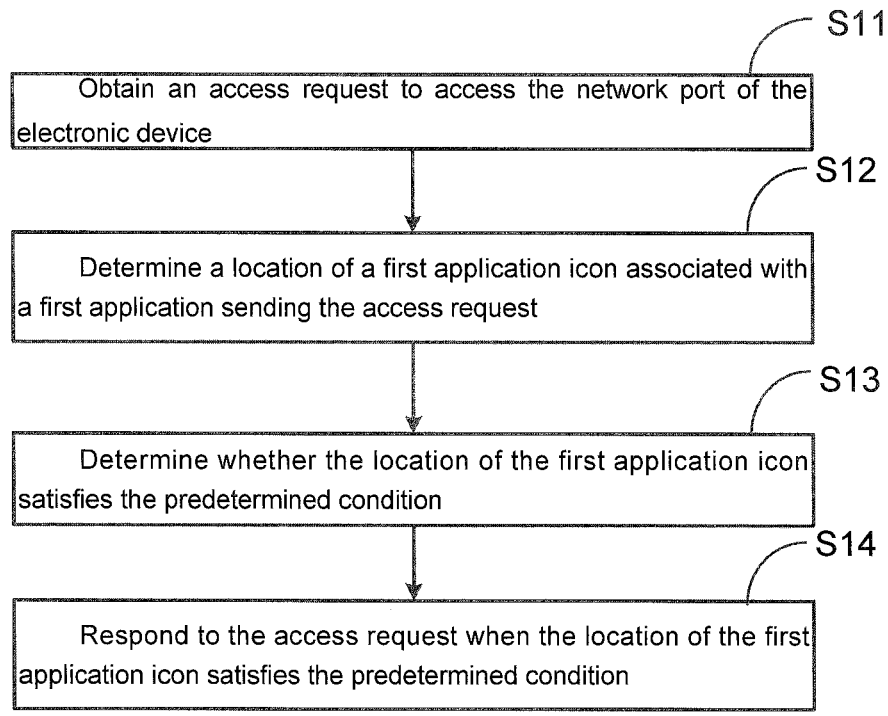
FIG. 9 is a flowchart illustrating an information processing method according to an embodiment of the present disclosure.

In an embodiment of the present disclosure, an information processing method is provided. As shown in FIG. 9, the method includes the following steps.

At step S11, an access request to access a network port of an electronic device is obtained.

In an embodiment of the present disclosure, when an application in the electronic device is to be connected to the network, it needs to send a network access request to a server via a network port, such that the electronic device can obtain the access request associated with the application.

In practice, the access request can be a general Hypertext Transfer Protocol (HTTP) request which can be used for requesting services from a server in batch.

Optionally, in an embodiment of the present disclosure, at least one preset management interface can be set in the electronic device prior to the step S11. Applications associated with application icons in the preset management interface can be those inhibited from accessing the network. In particular, there are two setting schemes.

Scheme I

A management interface having a first interface property is created in the electronic device as the preset management interface. Here, the first interface property inhibits any application having an associated application icon located within the preset management interface from accessing the port.

In practice, when creating a new management interface in the electronic device, the user can set the interface property of the new management interface.

For example, for a mobile phone displaying a management interface, the user long presses the display screen of the mobile phone to display options for setting an interface property of the new management interface. For example, a first option could be a first interface property that inhibits any application in the new management interface from accessing the network; and a second option could be a second interface property that permits any application in the new management interface to access the network. If the user selects the interface property associated with the first option as the interface property of the new management interface, the applications in the new management interface having the first interface property will be those inhibited from accessing the network, so as to avoid traffic consumption due to data synchronization over the network after deactivation of the applications.

In practice, the system typically sets the interface property of the new management interface as the second interface property by default without the user's setting.

Scheme II

The interface property of each of at least one of N management interfaces in the electronic device can be changed from a second interface property to a first interface property and each of the at least one management interface can be determined as the preset management interface. Here the second interface property permits any application having an associated application icon located within the management interface having the second interface property to access the network port and N is a positive integer.

Here, each of the N management interfaces can be management interfaces present in the electronic device and may include one or more application icons or may include no application icon. The user can select one or more of the N management interfaces for setting its/their interface property/properties.

In particular, once the interface property of each of the selected at least one management interface has been changed from the second interface property to the first interface property, the network connection function of any application having its associated application icon included in the at least one management interface will be disabled.

For example, a mobile phone includes four management interfaces each including at least one application icon each associated with an application. Among the management interfaces, a first management interface includes three application icons and currently has an interface property that permits the applications associated with the respective application icons in the interface to be connected to the network. If the interface property of the first management interface is changed into the first interface property, the electronic device will disable the network connection function of the applications associated with the respective three application icons included in the management interface.

In this way, the user can set the network connections for the applications associated with the application icons in the management interface collectively by setting the interface property of the management interface conveniently, without having to set each individual application, thereby achieving high management efficiency, convenient operation and low burden on the electronic device.

It is to be noted that, after creating the preset management interface with either of the above two schemes, since there are typically several management interfaces included in the electronic device, in order to distinguish the preset management interface from other management interfaces, the preset management interface can be displayed in a preset manner. For example, the frame or background of the preset management interface can be set to a particular color, e.g., red or blue. Further, the switching between the preset management interface and the other management interfaces can be done with a sliding operation on the display unit, such that the user can view the application icons included in these interfaces conveniently.

In practice, the preset management interface can occupy the entire display unit of the electronic device, or only a part thereof. In particular, there can be at least two situations as follows.

Situation I

The preset management interface has a fixed interface area which can be smaller than the area of the display unit such that it can be displayed at any position on the display unit. Alternatively, the fixed interface area can be the same as the area of the display unit.

Generally, the fixed interface area may accommodate a preset number of application icons. When the number of application icons exceeds the preset number, some application icons can be hidden in the preset management interface and the hidden application icons can be viewed or operated by sliding the preset management interface upwards and downwards. Alternatively, a new management interface having the first interface property can be created automatically and the application icons exceeding the preset number can be automatically moved to the new management interface.

Situation II

The interface area of the preset management interface may vary as the number of application icons increases or decreases. For example, when a new preset management interface is created with Scheme I, its initial interface area can be a first area which can accommodate at least three application icons. As the user moves more and more application icons to the preset management interface, its interface area increases gradually until it is the same as the area of the display unit, in which case some application icons can be hidden or a new preset management interface can be created automatically to satisfy the user's application. Similarly, the interface area can decrease gradually as the number of applications decrease.

At step S12, a location of a first application icon associated with a first application sending the access request is determined.

In an embodiment of the present disclosure, after the access request has been obtained via the network port, the first application can be determined and then the location of the first application icon associated with the first application in the display unit of the electronic device can be determined.

Of course, the location of the first application icon in the display unit of the electronic device can refer to a management interface, having an interface property, where the first application icon is located in the display unit, e.g., a preset management interface having the first interface property or a management interface having the second interface property.

In an embodiment of the present disclosure, once the first application icon has been moved to the preset management interface, the electronic device can disable the network connection function of the first application.

For example, when the user sets a preset management interface in a mobile phone and moves an application icon associated with the WeChat application to the preset management interface, the access request to the network port from the WeChat application will not be responded to.

Optionally, in an embodiment of the present disclosure, after application icons have been moved to the preset management interface, these application icons can be displayed in a preset display scheme. For example, the frame of each application icon can be automatically displayed in a predetermined color, e.g., yellow or blue, or an inhibition symbol can be displayed on each application icon, so as to indicate that the applications associated with these application icons are in a network connection disabled state. In this way, the user can be provided with an intuitive visual experience.

At step S13, it is determined whether the location of the first application icon satisfies a predetermined condition.

In an embodiment of the present disclosure, the predetermined condition can be the location of the first application icon being within a preset area. It can be determined whether the location of the first application icon is within a preset management interface, which is a management interface having a first interface property in the electronic device. The first interface property can inhibit any application having an associated application icon located within the preset management interface from accessing the port.

In particular, regarding the above determining process, when the location of the first application icon is not within the preset management interface, it is determined that the location of the first application icon satisfies the predetermined condition; otherwise it is determined that the location of the first application icon does not satisfy the predetermined condition.

For example, when the access request is associated with a news application and when it is detected that the news application icon associated with the news application is within the preset management interface having the first interface property, it can be determined that the location of the news application icon does not satisfy the predetermined condition. When the news application icon is within a management interface having the second interface property, it is determined that the location of the news application icon satisfies the predetermined condition.

At step S14, when the location of the first application icon satisfies the predetermined condition, the access request is responded to.

In an embodiment of the present disclosure, the determination result can be obtained in the step S13. Here, when it is determined that the location of the first application icon satisfies the predetermined condition, the electronic device can be controlled to respond to the access request. Then, the corresponding request data can be fed back based on the access request for e.g., synchronous data update.

On the other hand, if it is determined that the location of the first application icon does not satisfy the predetermined condition, the response to the access request can be inhibited, so as to prevent it from being connected to the network in background and consuming network traffic.

Optionally, in an embodiment of the present disclosure, the method can further include: receiving a movement operation for a second application icon within the preset management interface, the second application icon being associated with a second application, and the movement operation moving the second application icon out of the preset management interface; obtaining an application identifier associated with the second application; generating a control instruction corresponding to the application identifier to enable a network connection function of the application associated with the application identifier; and enabling the network connection function of the second application based on the control instruction.

Here, the movement operation can be an operation by the user on an application icon in the electronic device. For example, the user can drag an application icon on a touch screen of a mobile phone with a finger or a stylus.

The application identifier can be an identification number associated with the application. With the application identifier, its associated application can be determined uniquely in the electronic device, so as to generate a control instruction to enable a network connection function of the application, thereby resuming the network communication function, e.g., data synchronization, of the application.

In an embodiment of the present disclosure, the first application icon associated with the first application invoking the network port is determined and, when the location of the first application icon satisfies the predetermined condition, its access request can be responded to for network connection and data update. Hence, when the user wants to manage network access by an application in the electronic device, he/she can disable the network connection function of the application and avoid unintentional traffic consumption by moving it to the preset management interface or changing the interface property of the management interface including its application icon to the first interface property. On the other hand, when the user desires to connect an application in the preset management interface to the network, he/she can simply move it out of the preset management interface. Such operation process is simple, convenient and highly efficient.

Figure 10:
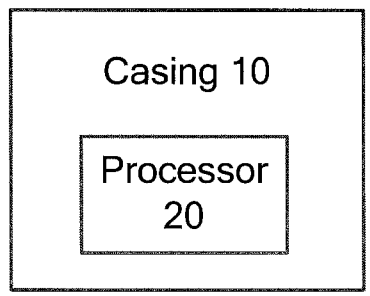
FIG. 10 is a block diagram showing a structure of an electronic device according to an embodiment of the present disclosure.

Based on the same inventive concept, the present disclosure provides an electronic device. As shown in FIG. 10, the electronic device includes a casing 10 and a processor 20.

In particular, the casing 10 is mainly used for protecting the body of the electronic device. It is typically made of impact resistant and dirt resistant materials such as alloy or plastic.

The processor 20 is provided within the casing 10 and can be configured to obtain an access request to access a network port of the electronic device; determine a location of a first application icon associated with a first application sending the access request; determine whether the location of the first application icon satisfies the predetermined condition; and respond to the access request when the location of the first application icon satisfies the predetermined condition.

Optionally, in an embodiment of the present disclosure, the processor 20 can be configured to determine whether the location of the first application icon satisfies the predetermined condition by: determining whether the location of the first application icon is within a preset management interface. The preset management interface is a management interface having a first interface property in the electronic device. The first interface property inhibits any application having an associated application icon located within the preset management interface from accessing the port.

Here, when the location of the first application icon is not within the preset management interface, it is determined that the location of the first application icon satisfies the predetermined condition; otherwise it is determined that the location of the first application icon does not satisfy the predetermined condition.

Optionally, in an embodiment of the present disclosure, when the first application icon has been moved to the preset management interface, the processor 20 can be further configured to: disable a network connection function of the first application after the first application icon has been moved to the preset management interface.

Optionally, the processor 20 can be further configured to: inhibit responding to the access request when the location of the first application icon does not satisfy the predetermined condition.

Optionally, in an embodiment of the present disclosure, the processor 20 can be further configured to: receive a movement operation for a second application icon within the preset management interface, the second application icon being associated with a second application, and the movement operation moving the second application icon out of the preset management interface; obtain an application identifier associated with the second application; generate a control instruction corresponding to the application identifier to enable a network connection function of the application associated with the application identifier; and enable the network connection function of the second application based on the control instruction.

Optionally, in an embodiment of the present disclosure, the processor 20 can be further configured to, prior to obtaining the access request to access the network port of the electronic device: create a management interface having the first interface property in the electronic device, as the preset management interface; and/or change the interface property of each of at least one of N management interfaces in the electronic device from a second interface property to the first interface property and determine each of the at least one management interface as the preset management interface. Here the second interface property permits any application having an associated application icon located within the management interface having the second interface property to access the network port and N is a positive integer.

Figure 11:
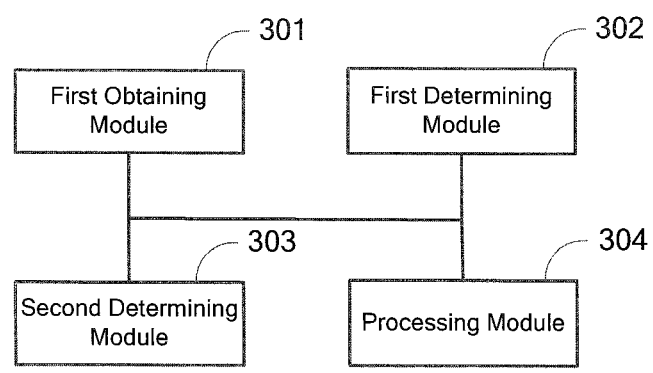
FIG. 11 is a block diagram showing a structure of an electronic device according to an embodiment of the present disclosure.

Based on the same inventive concept, the present disclosure provides an electronic device. As shown in FIG. 11, the electronic device includes a first obtaining module 301, a first determining module 302, a second determining module 303 and a processing module 304.

In particular, the first obtaining unit 301 can obtain an access request to access a network port of the electronic device.

The first determining module 302 can determine a location of a first application icon associated with a first application sending the access request.

The second determining module 303 can determine whether the location of the first application icon satisfies the predetermined condition.

The processing module 304 can respond to the access request when the location of the first application icon satisfies the predetermined condition.

Optionally, in an embodiment of the present disclosure, the second determining module 303 can determine whether the location of the first application icon is within a preset management interface. The preset management interface is a management interface having a first interface property in the electronic device. The first interface property inhibits any application having an associated application icon located within the preset management interface from accessing the port. When the location of the first application icon is not within the preset management interface, it is determined that the location of the first application icon satisfies the predetermined condition; otherwise it is determined that the location of the first application icon does not satisfy the predetermined condition.

Optionally, in an embodiment of the present disclosure, the electronic device can further include an operating module configured to move the first application icon to the preset management interface.

After the first application icon has been moved to the preset management interface, the processing module 304 can disable the network connection function of the first application.

Optionally, in an embodiment of the present disclosure, after determining whether the location of the first application icon satisfies the predetermined condition, the processing module 304 can inhibit responding to the access request when the location of the first application icon does not satisfy the predetermined condition.

Optionally, in an embodiment of the present disclosure, the electronic device can further include: a receiving module configured to receive a movement operation for a second application icon within the preset management interface, the second application icon being associated with a second application, and the movement operation moving the second application icon out of the preset management interface; a second obtaining module configured to obtain an application identifier associated with the second application; a generating module configured to generate a control instruction corresponding to the application identifier to enable a network connection function of the application associated with the application identifier; and an enabling module configured to enable the network connection function of the second application based on the control instruction.

In practice, the electronic device can further include a setting module configured to, prior to obtaining the access request to access the network port of the electronic device: create a management interface having the first interface property in the electronic device, as the preset management interface; and/or change the interface property of each of at least one of N management interfaces in the electronic device from a second interface property to the first interface property and determine each of the at least one management interface as the preset management interface. Here the second interface property permits any application having an associated application icon located within the management interface having the second interface property to access the network port and N is a positive integer.

In particular, the information processing method according to the embodiment of the present disclosure can be implemented by computer program instructions which can be stored in a storage medium such as an optical disc, a hard disk or a flash memory. The computer program instructions stored in the storage medium for implementing the information processing method include computer program instructions, when read or executed by an electronic device, for: obtaining an access request to access the network port of the electronic device; determining a location of a first application icon associated with a first application sending the access request; determining whether the location of the first application icon satisfies the predetermined condition; and responding to the access request when the location of the first application icon satisfies the predetermined condition.

Optionally, the computer program instructions stored in the storage medium for determining whether the location of the first application icon satisfies the predetermined condition include computer program instructions, when executed, for: determining whether the location of the first application icon is within a preset management interface. The preset management interface is a management interface having a first interface property in the electronic device. The first interface property inhibits any application having an associated application icon located within the preset management interface from accessing the port.

Here, when the location of the first application icon is not within the preset management interface, it is determined that the location of the first application icon satisfies the predetermined condition; otherwise it is determined that the location of the first application icon does not satisfy the predetermined condition.

Optionally, the computer program instructions stored in the storage medium include computer program instructions, when executed prior to determining whether the location of the first application icon satisfies the predetermined condition, for: moving the first application icon to the preset management interface; and disabling a network connection function of the first application after the first application icon has been moved to the preset management interface.

Optionally, the computer program instructions stored in the storage medium include computer program instructions, when executed subsequent to determining whether the location of the first application icon satisfies the predetermined condition, for: inhibiting responding to the access request when the location of the first application icon does not satisfy the predetermined condition.

Optionally, the computer program instructions stored in the storage medium include computer program instructions, when executed prior to responding to the access request when the location of the first application icon satisfies the predetermined condition, for: receiving a movement operation for a second application icon within the preset management interface, the second application icon being associated with a second application, and the movement operation moving the second application icon out of the preset management interface; obtaining an application identifier associated with the second application; generating a control instruction corresponding to the application identifier to enable a network connection function of the application associated with the application identifier; and enabling the network connection function of the second application based on the control instruction.

Optionally, the computer program instructions stored in the storage medium include computer program instructions, when executed prior to obtaining the access request to access the network port of the electronic device, for: creating a management interface having the first interface property in the electronic device, as the preset management interface; and/or changing the interface property of each of at least one of N management interfaces in the electronic device from a second interface property to the first interface property and determine each of the at least one management interface as the preset management interface. Here the second interface property permits any application having an associated application icon located within the management interface having the second interface property to access the network port and N is a positive integer.

When the functions of the methods according to the embodiments of the present disclosure are implemented in software functional modules and sold or used as a stand-alone product, they can be stored in a computer readable storage medium. In view of this, the technical solutions according to the embodiments of the present disclosure, or in other words a part thereof which makes contribution over the prior art, can be substantially embodied in a form of software product. The computer software product can be stored in a storage medium, such as ROM/RAM, magnetic disk, optical disc and the like, containing instructions which cause a computer device (which can be a personal computer, a server, a network device or the like) to perform one or more methods according to the embodiments of the present disclosure or particular parts thereof. The storage medium may be any of various mediums capable of storing program codes, such as a mobile storage device, a ROM, a RAM, a magnetic disk or an optical disc.

The embodiments in the specification are described in a progressive manner. The description of any embodiment focuses on the difference compared with other embodiments. The same or similar elements of the respective embodiments may refer to each other.

With the above description of the embodiments according to the present disclosure, those skilled in the art are enabled to implement or use the present disclosure. Various modifications to the embodiments will be apparent to those skilled in the art. The general principle defined herein can be implemented in other embodiments without departing from the spirit or scope of the present disclosure. Therefore, the present disclosure is not limited to those embodiments described herein, but conforms to the broadest scope consistent with the principle and novel features disclosed herein.

What is claimed is:

1. A method for setting application property, comprising:
   determining applications having identical properties as a group based on preset categories of properties, the categories of properties being preset by a user or based on functions of the applications;
   determining, based on a setting instruction, an object for the setting instruction, the object being a preset group including at least one application, wherein the setting instruction indicates a message output property of applications the message output property indicating whether to prompt a pushed message to a user or not; and
   setting the message output property of all the applications in the group uniformly in accordance with the setting instruction,
   wherein:
   in response to the message output property indicating to prompt the pushed message to the user, when any application in the group receives a pushed message, the push message is prompted to the user; and
   in response to the message output property indicating not to prompt the pushed message to the user, when any application in the group receives a pushed message, the push message is not prompted to the user.

2. The method of claim 1, wherein the preset group comprises:
   a preset display page for displaying at least one application, the display page being displayable in separate screens with a plurality of display pages, the pages displayed in separate screens constituting a desktop menu.

3. The method of claim 2, wherein said determining the object for the setting instruction based on the setting instruction comprises:
   determining, when the setting instruction is received from a user in a currently displayed group, the currently displayed group as the object for the setting instruction, the currently displayed group being a currently displayed page in the desktop menu or a currently opened folder in the preset folder.

4. The method of claim 2, wherein said determining the object for the setting instruction based on the setting instruction comprises:
   determining, when the setting instruction is received from a user at a first coordinate located within a display range of a folder, the folder as the object for the setting instruction.

5. A method for setting application property, comprising:
   adding a first application to a preset group;
   setting a public property before adding any application to the preset group; or
   setting, after adding applications to the preset group, the properties of all the application in the preset group uniformly to the public property, wherein the public property comprises a message output property of applications, the message output property indicating whether to prompt a pushed message to a user or not;
   obtaining a public property of the preset group that is common to all applications in the preset group; and
   setting the message output property of the first application to the public property of the preset group,
   wherein:
   in response to the message output property indicating to prompt the pushed message to the user, when any application in the group obtained a pushed message, the pushed message is prompted to the user;
   in response to the message output property indicating not to prompt the pushed message to the user, when any application in the group receives the pushed message, the push message is not prompted to the user.

6. The method of claim 5, wherein said adding the first application to the preset group comprises:
   adding the first application to a preset display page, the display page being displayable in separate screens with a plurality of display pages, the pages displayed in separate screens constituting a desktop menu.

* * * * *